(12) United States Patent
Barry et al.

(10) Patent No.: US 9,570,109 B2
(45) Date of Patent: Feb. 14, 2017

(54) METHOD AND SYSTEM FOR MATCHING AUDIO AND VIDEO

(71) Applicant: FORTY FIVE WEB SOUND LIMITED, Dublin (IE)

(72) Inventors: Dan Barry, Dublin (IE); Mikel Gainza, Dublin (IE); Cathal Furey, Dublin (IE)

(73) Assignee: FORTY FIVE WEB SOUND LIMITED, Dublin (IE)

( * ) Notice: Subject to any disclaimer, the term of this patent is extended or adjusted under 35 U.S.C. 154(b) by 0 days.

(21) Appl. No.: 14/763,788

(22) PCT Filed: Jan. 31, 2014

(86) PCT No.: PCT/EP2014/051891
§ 371 (c)(1),
(2) Date: Jul. 27, 2015

(87) PCT Pub. No.: WO2014/118319
PCT Pub. Date: Aug. 7, 2014

(65) Prior Publication Data
US 2016/0005437 A1      Jan. 7, 2016

Related U.S. Application Data

(60) Provisional application No. 61/759,942, filed on Feb. 1, 2013.

(51) Int. Cl.
*H04N 5/265*      (2006.01)
*G11B 27/036*     (2006.01)
(Continued)

(52) U.S. Cl.
CPC ......... *G11B 27/036* (2013.01); *G06F 3/04842* (2013.01); *G06F 3/04847* (2013.01); *G06F 17/30026* (2013.01); *G06F 17/30743* (2013.01); *G06F 17/30752* (2013.01); *G11B 27/034* (2013.01); *G11B 27/34* (2013.01);
(Continued)

(58) Field of Classification Search
CPC .................................................. G11B 27/036
See application file for complete search history.

(56) References Cited

U.S. PATENT DOCUMENTS 8,205,148 B1    6/2012  Sharpe et al.
2007/0250777 A1* 10/2007 Chen ....................... G10L 25/00
                                                                  715/723

(Continued)

FOREIGN PATENT DOCUMENTS

EP    2 450 898 A1    5/2012
EP    2 536 043 A1   12/2012

OTHER PUBLICATIONS

International Search Report, mailed Apr. 4, 2014, for PCT/EP2014/051891, 5 pages.
(Continued)

*Primary Examiner* — Eileen Adams
(74) *Attorney, Agent, or Firm* — Seed IP Law Group LLP

(57) ABSTRACT

The present application relates to the field of media processing and more particularly to audio and video processing. The present application addresses the problem that videos collected by fans at concerts and other events generally have poor sound quality and provides a solution that matches a high quality sound to the video.

20 Claims, 3 Drawing Sheets

(51) Int. Cl.
    *G06F 17/30*     (2006.01)
    *G11B 27/034*     (2006.01)
    *G11B 27/34*     (2006.01)
    *G06F 3/0484*     (2013.01)
    *H04N 21/439*     (2011.01)
    *H04N 21/472*     (2011.01)
    *G11B 27/28*     (2006.01)

(52) U.S. Cl.
    CPC ......... *H04N 5/265* (2013.01); *H04N 21/4394* (2013.01); *H04N 21/47205* (2013.01); *G11B 27/28* (2013.01)

(56) References Cited

U.S. PATENT DOCUMENTS

| | | | |
|---|---|---|---|
| 2009/0087161 | A1 | 4/2009 | Roberts et al. |
| 2010/0281375 | A1* | 11/2010 | Pendergast ........... G11B 27/034 715/723 |
| 2011/0222373 | A1* | 9/2011 | Lee ........................ G01S 5/18 367/124 |
| 2012/0198317 | A1 | 8/2012 | Eppolito et al. |
| 2013/0077805 | A1* | 3/2013 | Kirsch ................. G11B 27/105 381/119 |
| 2014/0036027 | A1* | 2/2014 | Liu ....................... H04N 7/157 348/14.07 |

OTHER PUBLICATIONS

Written Opinion, mailed Apr. 4, 2014, for PCT/EP2014/051891, 5 pages.

\* cited by examiner

METHOD AND SYSTEM FOR MATCHING AUDIO AND VIDEO

RELATED APPLICATIONS

This application claims the benefit of U.S. provisional patent application Ser. No. 61/759,942 to Barry et al., filed on Feb. 1, 2013 which is incorporated herein by reference.

FIELD OF THE APPLICATION

The present application relates to the field of media processing and more particularly to audio and video processing.

BACKGROUND OF THE APPLICATION

Concerts and other events have changed dramatically in recent years. There was a time where a fan would have nothing by which to remember the concert they went to other than perhaps a t-shirt purchased at the door. Now days, most mobile device have an in built video camera which allows users to capture the atmosphere of the concert as they experienced it. The recorded clips may readily be uploaded to a host of social networking websites or video sharing websites such as for example YouTube™ or VIMEO™.

Unfortunately, the sound quality of these video cameras is described at best as poor with the net result that the videos are generally only of interest to those who recorded them. To make matters worse, fans tend only to capture a small instance of the concert meaning that viewers are presented perhaps with just half a song. At the same time, artists and bands are not gaining advantage since their performances equally appear poor by virtue of the poor sound and short sequences.

The present application seeks to address these shortcomings.

SUMMARY

Accordingly, the present application provides a system for matching video clips to audio clips. More particularly, the system provides for the matching of video clips recorded by fans during an event, such as a concert, to an audio recording of the event. The audio recording is preferably obtained directly, e.g. as a feed from the sound desk at the concert. The high quality audio recording is suitably authorised by the artist or band and hence may be referred to as "artist"/"band" recorded audio. For ease of explanation, the application will use the term artist recorded audio to refer to an audio recording of a performance by an artist. In this context, the term artist should be taken to include any musical performer either individually or in a group. The artist audio recording of the event is preferably taken directly from the sound system at the event venue, for example as a direct feed from the sound desk. The system extracts the audio recorded in a fan's video clip and compares it with the artist's audio recording made of the event to match the start location of the fans video clip with a position in the artist's audio recording. The system then replaces the audio in the fan's video clip with an extract from the audio recording commencing at the matched position in the audio recording. The new video clip comprises the fan's video with the artist recorded audio. The new video clip may then made available to the fan and others. The fan thus has their video clip with poor quality audio upgraded to include a quality audio recording.

Accordingly, a first embodiment provides a method for matching audio and video, the method comprises the initial step of storing an audio recording; receiving a video clip from a user, the video clip comprising both audio and video; extracting the audio from the video clip; comparing the extracted audio with the stored audio recording to find a section of audio in the audio recording matching the audio from the video clip; and modifying the video clip by replacing the audio with the matched section from the audio recording.

The step of comparing may comprise performing a comparison of a proxy representation of the audio with a proxy representation of the extracted audio. The proxy representation may be suitably obtained by decimating the number of samples in the audio recording. The step of decimating may employ a sliding window averaging function. The degree of decimation is suitably greater than 20. For matching, the proxies suitably should represent audio effectively at the same sampling rate.

To assist in the identification process, a user may provide identification information for the audio recording. If the audio, e.g. concert, is not identified the task of identification is considerably longer when seeking to match a video clip to the audio. Accordingly, it is also useful if the user provides identification information for the video clip. Where identification information is provided, the method may comprise the step of pre-matching the audio recording to video clip by determining a match for the identification for the audio recording and the identification for the video clip. The identification information may include at least one of: a) the date of the recording; b) the location of the recording; and c) the name of the artist. It will be appreciated that even if just one is provided the task of matching is improved since the number of matches is considerably reduced.

The method may also comprise the step of providing a graphical user interface to a user. The graphical user interface suitably provides a timeline for an audio recording along a first axis and a video window, wherein the timeline identifies the locations of one or more modified video clips in the timeline corresponding to the audio recording. These clips may have been provided by a plurality of users. A video clip is played back in the video window corresponding to the point in the timeline. A user may selectively switch between modified video clips by clicking on the timeline.

In a second embodiment, a system is provided for matching audio and video, the system comprising: a database storing one or more audio recordings; an interface for receiving a video clip from a user, the video clip comprising both audio and video; a matching engine for extracting the audio from the video clip and comparing the extracted audio with an audio recording from the database to find a section of audio in the audio recording matching the audio from the video clip, and for substituting the audio of the video clip with the matched audio from the audio recording. The matching engine may be configured to perform the comparison by comparing a proxy representation of the audio with a proxy representation of the extracted audio. The proxy representation may be obtained by decimating the number of samples in the audio recording. The matching engine may employ a sliding window averaging function to decimate the number of samples in the audio recording. Suitably, the degree of decimation is greater than 20. For ease of matching and processing, the proxies preferably should represent audio effectively at the same sampling rate.

The interface may allow a user to provide identification information for the audio recording. The interface may then allow another user to provide identification information for the video clip. Having this identification information, the matching engine may be configured to pre-match the audio recording to the video clip by determining a match for the user provided identification for the audio recording and the user provided identification for the video clip. The identification may include at least one of: a) the date of the recording; b) the location of the recording; and c) the name of the artist.

Suitably, the graphical user interface may provide a timeline of the audio recording along a first axis and video window, wherein the timeline identifies the locations of one or more modified video clips in the timeline. Where this is provided a user may selectively switch between the modified video clips by clicking on the timeline.

BRIEF DESCRIPTION OF THE DRAWINGS

The present application will now be described with reference to the accompanying drawings in which.

DETAILED DESCRIPTION OF THE DRAWINGS

Figure 1:
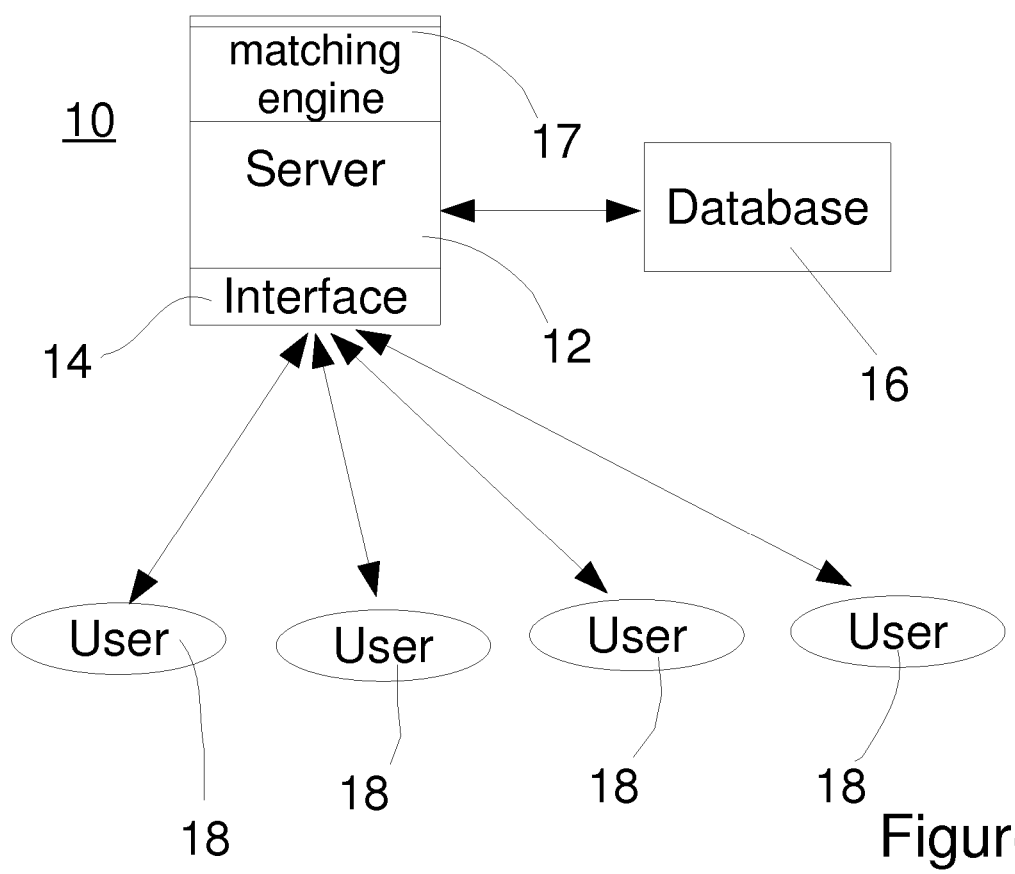
FIG. 1 is a diagram of a system according to a first aspect of the present application.

The present application provides a system 10, as illustrated in FIG. 1, comprising a server 12 which provides a user interface 14 to users 18 allowing a user to upload an audio recording or a media clip comprising video and audio to the server, referred to generally herein after as video clips. Users in this respect may be separated into three different classes. The first class, referred to generally as Artists, are persons authorised by the artist performing at an event to make a high quality audio recording at the event, for example by taking a feed from the sound desk at the event. This first class of user may require a special registration process, which may include offline steps, to be allowed to use the system. This first class of user are allowed to set-up an event on the system and to upload a high quality audio recording of the event. The second class of users are referred to generally as fans and they are able to upload fan recorded video clips from an event. A third class of user is a viewer who uses the interface to watch fan recorded video clips with artist recorded audio. The interface may be implemented in a number of ways including for example as a web interface or as an application on the user device which interacts with the server. The uploaded audio recording and or media clips may be stored in a database 16 or databases to which the server is connected. The server uses a matching process to match the video clips to the audio recording. The matching process (described below) may be implemented in code on the server and is illustrated generally as matching engine 17.

Figure 2:
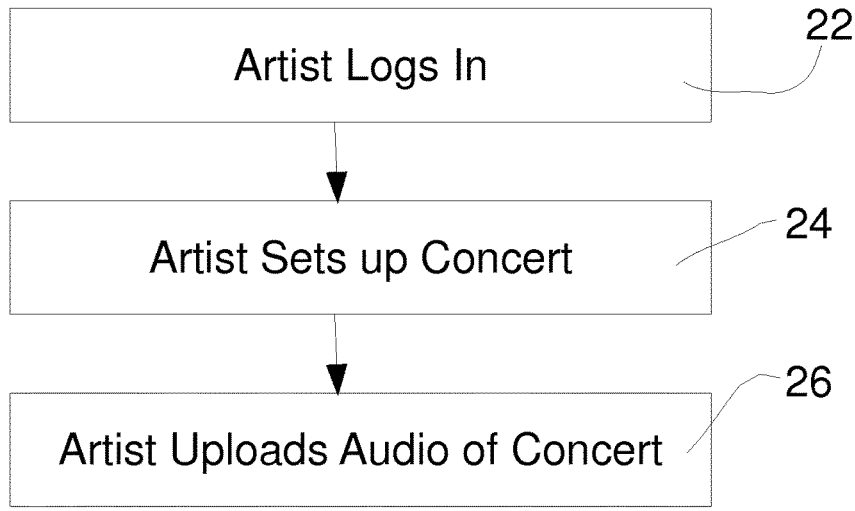
FIG. 2 is a method that might be employed by an artist in using the system of FIG. 1.
Figure 3:
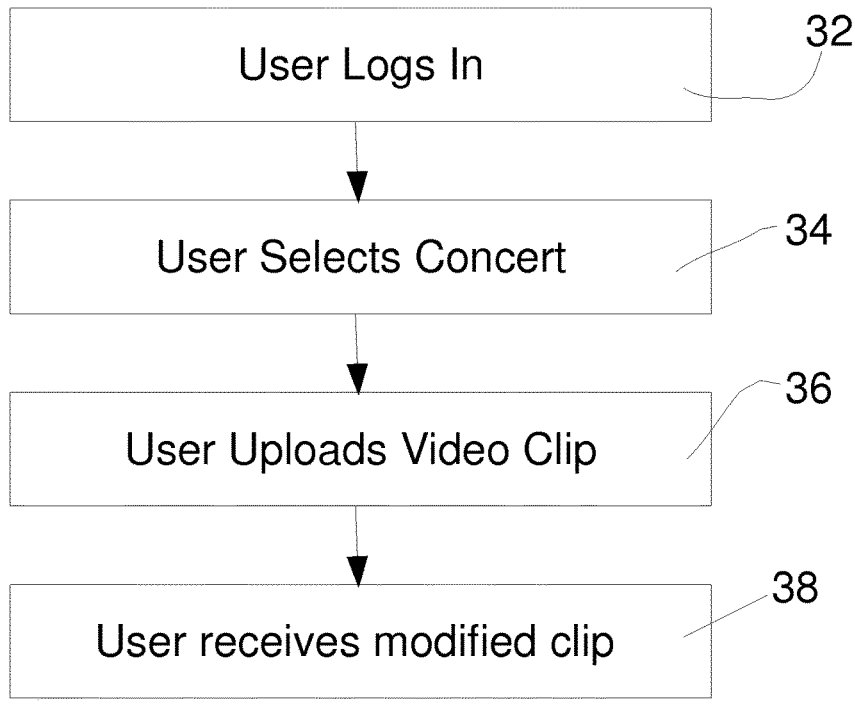
FIG. 3 is a method that might be employed by a user in using the system of FIG. 2.

The mode of usage of the system will now be explained with reference to some exemplary methods for different users of the system as shown in FIGS. 2 and 3. In the first method 20, an artist or somebody on behalf of the artist makes an audio recording of a concert. Suitably, this recording is taken directly from the sound equipment of the concert venue, for example at the sound desk so that the quality of the audio recording is relatively high. The system allows for the artist to log-in 22 to the system. Once logged in, the Artist may set up their concert 24 including for example providing the date and venue of the concert. This may be done in advance of the concert so that fans may be informed that the concert will be available on the server subsequent to the concert. The fans may be notified directly on the artist's website, at the event venue or through a social media account of the system or artist. Once a concert has been set up, the artist may upload 26 their audio recording of the concert to the server, where it is stored in the database.

Fans may as, per the method 30 of FIG. 3, log in 32 to the system using, select a concert 34 and upload 36 a video clip that they recorded at the concert. The system extracts the generally poor audio from the video clip and replaces it with high quality sound from the previously uploaded audio recording to provide 38 a modified clip. This modified clip is then provided 38 to the user. The clip may be provided directly, e.g. as a download or alternatively a link to the location where the modified clip is stored may be provided to the user. In one arrangement, the modified clips are stored on another system, for example, a video storage service such as YouTube™ or VIMEO™.

The system further provides an interface for users to view clips of a particular concert which they or others may have uploaded.

Figure 4:
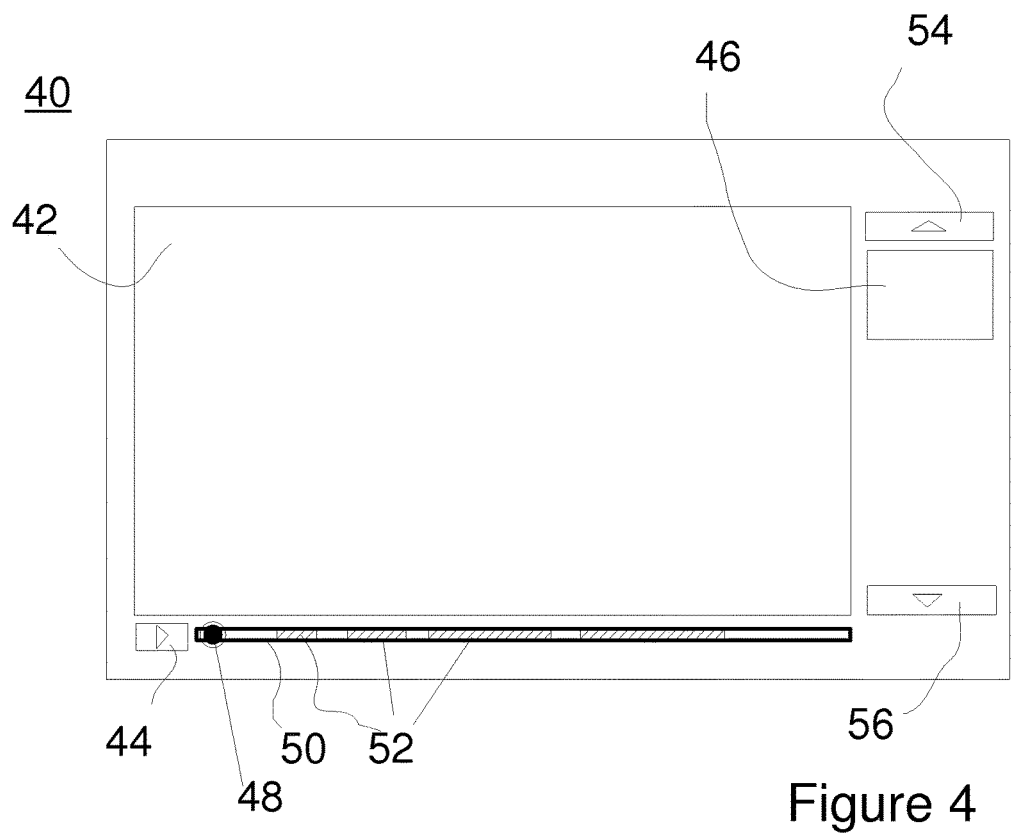
FIG. 4 is an exemplary user interface that may be employed with the system of FIG. 1.

This interface 40, an exemplary layout of which is shown in FIG. 4, provides a video playback window 42 in which video may be presented to the user. One or more controls are provided to the user allowing them to control the video interface. For example, a control 44 may be provided to a user to start\stop playback of video. Other controls may also be provided including for example but not limited to volume control for the audio. In addition, a time line feature 50 may be provided indicating the position of the playback of the video in the video window with respect to the full length. The position may be indicated by a slider 48 or similar feature which progresses along the timeline 50 as playback progresses. The timeline is associated with the Artist recorded audio.

Figure 5:
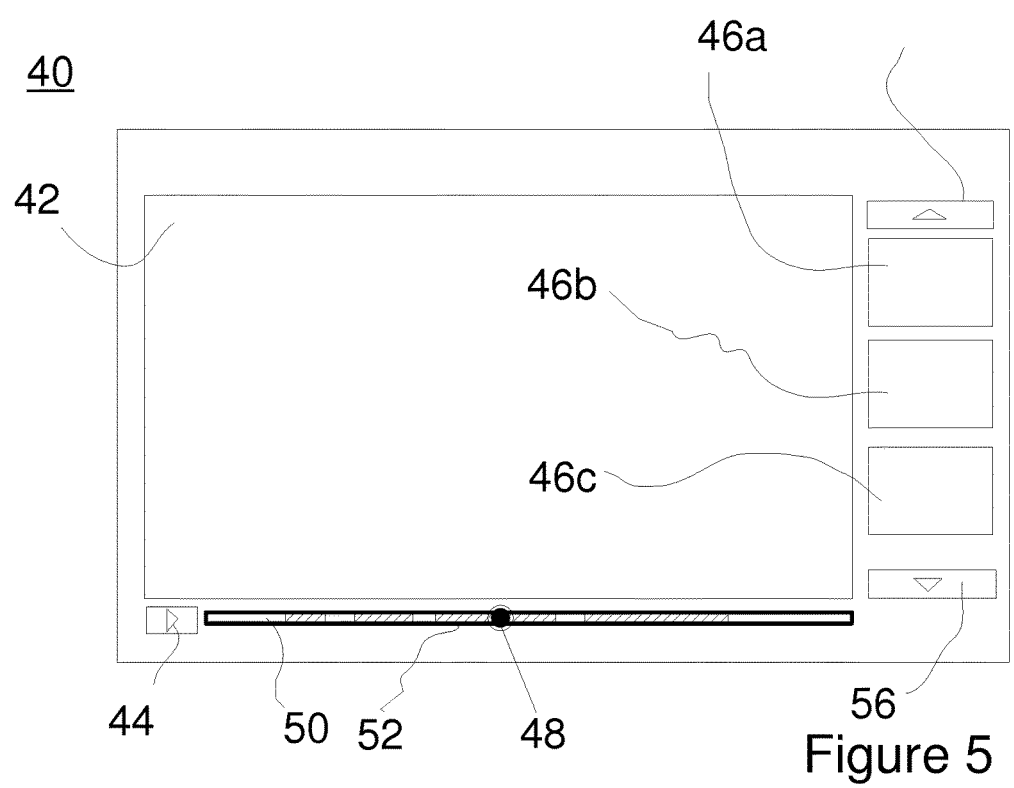
FIG. 5 is a further exemplary user interface that might be employed with the system of FIG. 1.

In contrast, to prior art video playback interfaces, the timeline of the present application indicates places where there is more than one video clip available to be viewed. In the exemplary interface, this is provided by showing an individual picture 46 on the right hand side of the playback window for each video clip available at a particular instant in the time line. The individual picture is suitably a snapshot from the video clip, for example the opening frame of each video clip. As playback progresses or as the user moves the slider along the timeline the video clips available and hence the pictures on the RHS side change (as illustrated in FIG. 5 which shows the availability of three video clips 46a, 46b, 46c in contrast to the single clip 46 of FIG. 4). The interface uses timing information obtained from the sound matching process described below to associate fan video clips with different points/sections along the timeline. Thus as a user moves the slider along the timeline representing the artist recorded audio, the interface determines from the database as to which fan recorded video clips are available for a particular instant along the timeline and displays images for the available clip, which in turn a user may scroll though using appropriate buttons 54, 56 or features to select or switch between different fan recorded clips available. Once highlighted, a fan video clip may be played or switched to from a currently playing fan video by means of a click or double click. The corresponding video at the corresponding time location in the video clip is then played back to the user in the video window 42.

The timing information is suitably stored in the database along with the modified fan recorded video clips or links thereto and the artist recorded audio. The timeline may also indicate by highlighting, for example by a different colour, shading or outline, sections 52 in the audio where a video clip or clips are available. Where more than one clip is available, the colour, shading and outline may change to indicate this. For example, where a single clip is available the section of the timeline might be highlighted as single bar, where there are two clips available two parallel bars one on top of the other may be shown and so on.

Whilst it is possible to use different sound matching algorithms to match a fans video clip to the artist audio recording, the present application provides one that is particularly suited to the requirements resulting from the nature of the environment in which the fan video recordings are made and the quantity of data produced.

Examples of the constraints under which the algorithm must operate include but are not limited to:
1. The master audio file, representing the high quality recording of a music show, may be 2 hours or longer and accordingly equate to over 1.2 gigabytes of data. At the same time, the audio material uploaded by the fan can be any duration from a few seconds to several tens of minutes. To match this data (in raw form) would be extremely processor intensive and would place an unbearable load on the servers if the site was receiving a lot of traffic.
2. The query audio (audio on a fans video clip) comes from the fans who are recording video typically using mobile phones, digital cameras and other video recording devices. The audio quality from such devices is typically very poor but when exposed to high sound pressure levels as experienced at music events, the microphones and circuitry are overloaded and produce huge amounts of harmonic distortion. This significantly changes the audio signal and makes matching difficult.
3. The audio sampling rate of each device is different making direct matching impossible.

Accordingly to address these problems, the audio matching method employed by the present system performs two principal operations:
1. Proxy Generation, and
2. Matching The proxy generation algorithm is performed on both the master (artist) audio and the query (fans) audio to reduce the complexity of data, thus making the matching process much more efficient since there is less data to process. In effect, a proxy is a 'compressed' representation of the original audio. The sound matching algorithm begins by applying a compression algorithm to generate a highly compressed representation of the master audio recorded for an event to provide a proxy file, herein after referred to as the master proxy file. This compressed representation is stored for use in matching any video clips received for the event. The compressed representation of the master audio is stored so that it need not be generated each time a fan uploads a new video clip. Upon receipt of a video clip from a fan, the compression algorithm is also applied to the audio extracted from the video clip to provide a clip proxy file. As will be explained below the proxy generation process applied may be differently applied to the master file as to a fans clip.

Specifically, the proxy generation process overcomes the speed of matching (processor load) constraints by reducing the file size of the master audio by a factor S, for example in one implementation which has been used approximately 50 times. It also uses dynamic re-sampling within the proxy generation process in order to match the sample rate of a query (fan clip) to that of the master audio. Finally, a data reduction filter removes the spurious harmonic distortion from the proxy while retaining enough data to allow accurate matching. It should be understood that the proxy is not an audio file as such and cannot be used as such. It is just a data representation which retains certain timing information so as to allow matching.

The proxy generation process also improves the accuracy of the matches as it removes redundant noisy data which can create false match candidates.

When a master audio file is uploaded, a single proxy is created and cached for future matching against that file. When a query file is uploaded by a fan, a proxy is generated for the fan's file. The process for generating query proxies employs the sampling rate of the master audio. Only the proxy files are used for matching, since they have been generated to speed up the matching process. Once the matching time location has been calculated, the original audio is then used in the substitution process to insert quality audio onto a user's video clip using the identified time location to select the audio to be taken from the artists recording and substituted into the fan's video clip.

The algorithm employed is a highly efficient scalable algorithm, which is capable of matching and aligning highly distorted audio recordings from small mobile devices, with master recordings of the same events. It has been found in a practical implementation to have a high degree of accuracy with a matching accuracy of 99% and the alignment accuracy of a match is within +/−10 milliseconds of the original. It will be appreciated that this is advantageous for maintaining audio/video synchronization in the newly rendered video. Furthermore, the efficiency of the algorithm allows 5 minutes of audio to be matched in approximately 5 seconds.

An exemplary proxy process will now be described. The proxy process takes an audio signal of length M samples. This audio signal is reduced (decimated) to size M/S samples by applying a sliding window to the data where S is a scaling value. The sliding window is suitably a sliding weighted averaging window, W, of length S samples which is applied to the entire signal. The weighted averaging window may employ a raised cosine window (Hanning Window) or other suitable function. Each output sample of the proxy is generated by multiplying the window, W, by a block of samples of the same length in the audio file (M(n:n+S)) and integrating the result. The resulting single sample now represents an average of the surrounding S samples. The process is repeated for each S sample frame. The signal is reduced in size due to the decimation effect of the sliding window and furthermore, the signal is filtered by the averaging effect of the window so that high frequencies are removed. In the particular example using a value of 50 for S, which has been found to be a reasonable one, the resulting proxy is limited to frequency content below approximately 440 hz (for a 44.1 Khz sampling rate) and at the same time is reduced in size by a factor of 50. The operation is highly efficient since both operations are achieved in the same process loop. The remaining data has significantly less harmonic distortion than the raw data and is conducive to more accurate matching than using raw audio alone. It will be understood that the proxy for the master is only generated once but may be used repeatedly as users upload their video clips. S may in one implementation be a value selected to be greater than 20.

The proxy process above is generally applied to both master and query audio but there is a slight difference in how each is processed. The sample rates of the master and query may not be the same. Accordingly, it is appropriate to take account of this in the proxy generation process. The master audio sample rate is used as the base sampling rate for all matching and as a result the decimation factor S (e.g. 50) is always taken to be the same for the master audio proxy regardless of the sample rate. However, when generating the proxy for the query, a window length and decimation factor is selected which is equal to $S*(Fs_{(q)}/Fs_{(m)})$ where $Fs_{(q)}$ and $Fs_{(m)}$ denote the sample rates of the query and master respectively. This ensures that the rates of the resulting proxy files are equivalent. Decimation, filtering and cross sampling are all achieved in the same process loop making the operation extremely efficient.

As previously described, both the audio query and the master audio recordings are transformed into highly condensed signal representations, which are denoted as "proxies". Following this, the process of matching an audio query against a master audio recording is performed using a short-time frequency based correlation technique, in which the similarity between the audio query and individual short time segments of the master recording is investigated in an iterative fashion.

The process is described as follows; in each iteration i, a window of M samples of the "master proxy" is correlated against the "query proxy", which has a length of N samples. In order to perform the next iteration of the analysis, (i+1), the analysis window is then shifted by M−N samples. The number of iterations in the short time analysis depends on the length of the audio proxy (N) as well as the length of the master recording.

The correlation of M "master proxy" samples against N samples of the audio query generates a correlation function of M+N−1 samples. The correlation may be performed using Fast Fourier Transform (FFT) techniques which would be familiar to those skilled in the art. The size of the analysis window, N, will be governed by the FFT size. In the analysis, an FFT size equal to $2^{21}=2097152$ samples is used. Consequently, in order to avoid any signal distortion, the following condition may be imposed: M+N−1=2097152, which leads to M=2097153−N. If there are not enough samples to fulfil the above condition in the last iteration of the analysis, zero padding may be used.

As an example, 2097152 decimated samples, which were calculated using a decimation factor of 50 and a sampling rate equal to 44.1 KHz, correspond to a non-decimated signal of 39.6287 m. Thus, for an audio query of 10 m, the analysis window will approximately cover 30 m of master audio.

In each iteration, the correlation function generates M+N−1 samples. However, there will only be M−N samples where the "audio proxy" fully correlates with any M samples of the "master proxy". Consequently, only the correlation prominence of the first M−N samples will be kept as "matching candidates". Following this, the analysis window will be shifted using a hop size of M−N samples.

Once the totality of "prominence candidates" have been fully processed, the position that provides the most prominent value will be extracted as the "matching position". Finally, the "matching position" will by interpolated using the same decimation factor used in the "proxy calculation" to determine the corresponding position in the original master audio file from which the audio will be substituted into the users clip.

As the matching algorithm returns the time point in the master for which a match to the query was found, the match time can be used to extract audio from the original master (artist) recording for the identified point in time and to replace the audio clip from the fans video clip with the extracted audio thus rendering the user's video clip with the high quality sound from the master audio. The rendered user's clip may then be provided back to the user. The rendered clip may be provided directly, e.g. as a file or as a link to the rendered user's clip. For example, the rendered user's clip may be uploaded to a video file service such as YouTube, Vimeo or similar and a user provided a link to the uploaded video.

The advantages of the present method over prior art methods is that the existing audio matching solutions are slow and computationally inefficient, which severely reduces their speed of execution. Further, they are typically designed to operate with high quality audio as opposed to highly distorted audio and have difficulty achieving the required accuracy for synchronisation.

Whilst the present application has been described generally in terms of concerts, artists and fans, it will be understood that these should not be narrowly construed and that the same system and methodology may be employed in other environments. For example, the method and system might be employed in the context of a wedding with a high quality audio recording obtained from a feed from the wedding venues sound system and the clips recorded by guests at the wedding. Equally, the technique may be employed at sporting and similar events.

The words comprises/comprising when used in this specification are to specify the presence of stated features, integers, steps or components but does not preclude the presence or addition of one or more other features, integers, steps, components or groups thereof.

The invention claimed is:

1. A method for matching audio and video, the method comprising:
   recording high quality audio directly from a sound system at an event venue,
   storing the high quality audio recording;
   receiving a video clip from a user, the video clip comprising both audio and video;
   extracting the audio from the video clip;
   comparing the extracted audio with the stored audio recording to find a section of audio in the high quality audio recording matching the audio from the video clip; and
   modifying the video clip by replacing the audio with the matched section from the high quality audio recording, wherein the comparing comprises performing a comparison of a proxy representation of the audio with a proxy representation of the extracted audio;
   receiving an identification for the audio recording from a user;
   receiving an identification for the video clip from a user; and
   pre-matching the audio recording to video clip by determining a match for the identification for the audio recording and the identification for the video clip received from a user, wherein the identification includes at least one of: a) the date of the recording; b) the location of the recording; and c) the name of the artist.

2. The method of claim 1, wherein the proxy representation is obtained by decimating the number of samples in the audio recording.

3. The method of claim 2, wherein the decimating employs a sliding window averaging function.

4. The method of claim 3, wherein the degree of decimation is greater than 20.

5. The method of claim 1, wherein the proxies represent audio effectively at the same sampling rate.

6. A method according to claim 1, further comprising providing a graphical user interface to a user, the graphical user interface providing a timeline of the audio recording along a first axis and video window, wherein the timeline identifies the locations of one or more modified video clips in the timeline.

7. A method according to claim 6, wherein a user may selectively switch between the modified video clips by clicking on the timeline.

8. A system for matching audio and video, the system comprising:
- a database storing one or more high quality audio recordings recorded directly from a sound system at an event venue;
- an interface for receiving a video clip from a user, the video clip comprising both audio and video;
- a matching engine for extracting the audio from the video clip and comparing the extracted audio with an audio recording from the database to find a section of audio in the audio recording matching the audio from the video clip, and for substituting the audio of the video clip with the matched high quality audio from the audio recording, wherein the matching engine is configured to perform the comparison by comparing a proxy representation of the audio with a proxy representation of the extracted audio,
- wherein the interface allows a user to provide an identification for the audio recording;
- wherein the interface allows a user to provide an identification for the video clip and wherein the matching engine is configured to pre-match the audio recording to the video clip by determining a match for the user provided identification for the audio recording and the user provided identification for the video clip; and wherein the identification includes at least one of: a) the date of the recording; b) the location of the recording; and c) the name of the artist.

9. A system according to claim 8, wherein the proxy representation is obtained by decimating the number of samples in the audio recording.

10. The system of claim 8, wherein the matching engine employs a sliding window averaging function to decimate the number of samples in the audio recording.

11. The system of claim 10, wherein the degree of decimation is greater than 20.

12. The system of claim 8, wherein the proxies represent audio effectively at the same sampling rate.

13. The system according to claim 8, wherein the graphical user interface provides a timeline of the audio recording along a first axis and video window, wherein the timeline identifies the locations of one or more modified video clips in the timeline.

14. The system of claim 13, wherein a user may selectively switch between the modified video clips by clicking on the timeline.

15. A method for matching audio and video, the method comprising:
- recording audio on a first device at an event to provide an audio recording of the event,
- storing the audio recording of the event;
- recording a video clip on a second device at the event, the video clip comprising both audio and video;
- storing the video clip;
- extracting the audio from the stored video clip;
- comparing the extracted audio from the stored video clip with the stored audio recording to find a section of audio in the audio recording matching the audio from the stored video clip; and
- modifying the video clip by replacing the audio with the matched section from the audio stored audio recording of the first device to provide a modified video clip, wherein the step of comparing comprises performing a comparison of a proxy representation of the audio with a proxy representation of the extracted audio, wherein a user provides an identification for the audio recording;
- receiving a user provided identification for the video clip; and
- pre-matching the audio recording to the video clip by determining a match for the identification for the audio recording and the identification for the video clip, wherein the identification includes at least one of: a) the date of the event; b) the location of the event; c) the name of the event; d) an identification for the event; and e) the name of the artist at the event.

16. The method of claim 15, wherein the proxy representation is obtained by decimating the number of samples in the audio recording.

17. The method of claim 16, wherein the decimating employs a sliding window averaging function.

18. The method of claim 17, wherein the degree of decimation is greater than 20.

19. The method of claim 15, wherein the proxies represent audio effectively at the same sampling rate.

20. A method according to claim 15, further comprising:
- providing a graphical user interface to a user, the graphical user interface providing a timeline of the audio recording along a first axis and video window, wherein the timeline identifies the locations of one or more modified video clips in the timeline.

* * * * *